United States Patent [19]

Jones

[11] Patent Number: 4,738,504
[45] Date of Patent: Apr. 19, 1988

[54] FIBER OPTIC CABLE TERMINATION

[75] Inventor: Theodore L. Jones, Lancaster, Pa.
[73] Assignee: RCA Corporation, Del.
[21] Appl. No.: 893,825
[22] Filed: Oct. 23, 1986

Related U.S. Application Data

[62] Division of Ser. No. 785,790, Oct. 9, 1985.

[51] Int. Cl.$^4$ .............. G02B 6/36; H01J 5/16
[52] U.S. Cl. .............. 350/96.20; 350/96.17; 350/96.23; 250/227
[58] Field of Search ........... 350/96.10, 96.15, 96.23, 350/96.20, 96.21, 96.22, 96.24, 96.17; 156/85, 86, 293; 250/227; 357/74

[56] References Cited

U.S. PATENT DOCUMENTS

| | | | |
|---|---|---|---|
| 4,132,461 | 1/1979 | Jacques et al. | 350/96.20 |
| 4,198,119 | 4/1980 | Uberbacher | 350/96.20 |
| 4,237,474 | 12/1980 | Ladany | 357/81 |
| 4,255,015 | 3/1981 | Adams et al. | 350/96.20 |
| 4,273,413 | 6/1981 | Bendiksen et al. | 350/96.20 |
| 4,290,668 | 9/1981 | Ellis et al. | 350/96.20 |
| 4,319,802 | 3/1985 | Bowes | 350/96.20 |
| 4,432,129 | 2/1984 | Featsent | 29/447 |
| 4,461,538 | 7/1984 | Breed, III et al. | 350/96.20 |
| 4,479,698 | 10/1984 | Landis et al. | 350/96.20 |
| 4,488,040 | 12/1984 | Rowe | 250/227 |
| 4,509,820 | 4/1985 | Murata et al. | 350/96.21 |
| 4,626,067 | 12/1986 | Watson | 350/96.20 |
| 4,640,725 | 2/1987 | Jones | 350/96.21 X |
| 4,699,462 | 10/1987 | Jones | 350/96.23 |

FOREIGN PATENT DOCUMENTS

| | | | |
|---|---|---|---|
| 55-111911 | 8/1980 | Japan | 350/96.20 |
| 60-186813 | 9/1985 | Japan | 350/96.20 |

OTHER PUBLICATIONS

RCA Corporation publication, 1 page.
AMP Corporation advertisement, 1 page.

Primary Examiner—William L. Sikes
Assistant Examiner—Brian M. Healy
Attorney, Agent, or Firm—Fred Jacob

[57] ABSTRACT

A method is disclosed for making a termination between (a) a fiber optic cable having a centrally positioned optical fiber, a plurality of reinforcement strands positioned about the optical fiber, and a jacket positioned about the reinforcement strands; with (b) an electro-optic component housing having a tubular extension. In accordance with the method of this invention, in the initial step a predetermined length of the outer jacket is removed from the fiber optic cable to expose a length of optical fiber and reinforcement strands. The optical fiber is then inserted into and through a passage in the tubular extension to a point within the component housing and preferably fixed in place. The reinforcement strands are then positioned about the outer diameter surface of the tubular extension so that portions of the outer diameter of the tubular extension are covered with the reinforcement strands and other areas are left exposed. Then an adhesive is placed over the strands, the exposed areas of the tubular extension, and a portion of the jacket remaining on the fiber optic cable. A heat-shrinkable tubing is then positioned over the adhesive. The tubing is then heated causing it to shrink and make adhesive connection of the exposed area of the tubular member, the reinforcement strands, the jacket of the cable, and the heat-shrink tubing.

1 Claim, 1 Drawing Sheet

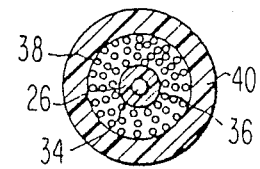
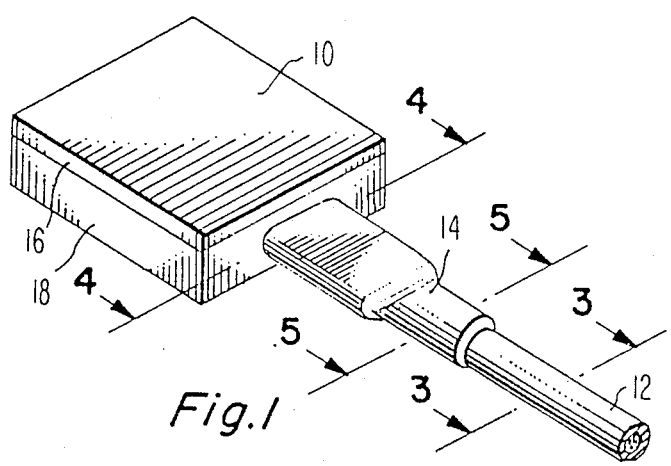
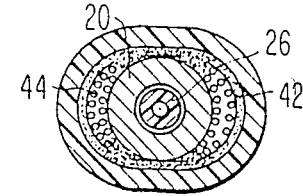
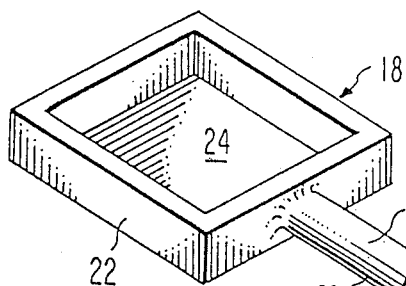
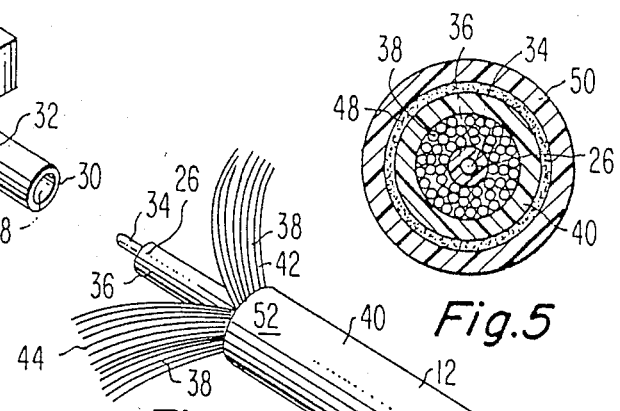
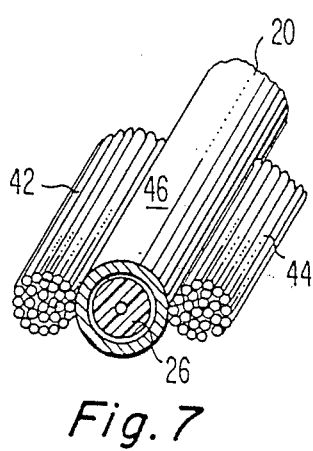 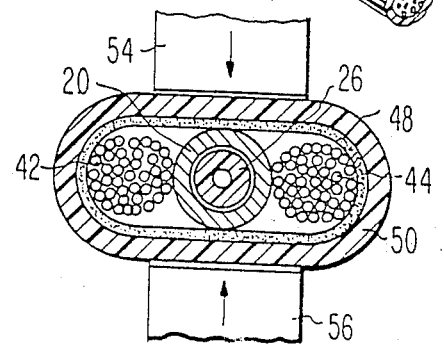

FIBER OPTIC CABLE TERMINATION

This is a division of application Ser. No. 785,790, filed Oct. 9, 1985.

This invention relates to a novel fiber optic cable termination and to the method of forming the termination. More particularly, this invention is concerned with a fiber optic cable termination for use in securing a fiber optic cable to an electro-optic component housing.

BACKGROUND OF THE INVENTION

Electro-optic systems comprised of optical fibers and electro-optic components are used in a wide variety of commercial applications, such as in telecommunication of data and the like.

The optical fibers which are commonly employed have a relatively small diameter core comprised of an optically transparent material and a cladding layer of a polymeric material around the outer surface of the core which acts to inhibit the dissipation of light from the core. Since optical fibers are relatively weak, they are subject to breakage when strain is applied to them. In addition, if strain is applied to an optical fiber within an electro-optic system, the terminal end of the optical fiber can be forced out of alignment with an electro-optic component, causing the electro-optic system to become inoperative. The optical fibers conventionally are protected by being encased in a fiber optic cable. The most commonly employed type of fiber optic cable has an optical fiber in the center of the cable, a plurality of reinforcement strands positioned circumferentially about the optical fiber and aligned with the length of the optical fiber so as to be capable of relieving strain on the optical fiber, and an outer jacket disposed over and about the reinforcement strands.

The electro-optic components include many different types of devices, such as light emitters, light detectors, signal repeaters and the like. Many of the electro-optic components are highly sensitive to environmental contaminants and are highly susceptible to physical damage. To prevent damage to the components the components are sealed in protective component housings. The component housings are made in various shaped configurations to accommodate the different types of devices but they all include an opening for passage of an optical fiber through to the interior of the component housing.

When connecting a fiber optic cable to an electro-optic component, a terminal end of the optical fiber must be precisely aligned with the electro-optic component packaged in a component housing and secured in position. The component housing is then preferably hermetically sealed and the remaining portions of the fiber optic cable, that is, the reinforcement strands and the jacket, are trimmed and secured to the component housing with a mechanical fiber optic cable coupler or a length of heat-shrink tubing.

The terminations of the fiber optic cables to the component housing present serious production and performance problems. In order for the fiber optic cable to protect the optical fiber from strain, the ends of the reinforcement strands must be locked in position so as to absorb any strain placed on the fiber optic cable. Certain of the suggestions heretofore made for terminations required a relatively complex series of steps and a skilled operator to make an even marginally satisfactory termination. Other suggestions required special fittings similar to those used to couple lengths of fiber optic cable together, which couplings resulted in the connection being excessively large. The most serious problem encountered with the suggested methods was that they did not provide adequate strain relief so as to prevent breakage and misalignment of the optical fibers with the components.

It would be highly desirable if a method could be provided for making a termination of a fiber optic cable with a component housing, which termination would be simple to make, compact and would provide sufficient strain relief so as to protect the optical fiber from breakage and misalignment.

SUMMARY OF THE INVENTION

A method is disclosed for making a termination between (a) a fiber optic cable of the type having a centrally positioned optical fiber, a plurality of reinforcement strands positioned about the optical fiber, and a jacket positioned about the reinforcement strands; and (b) an electro-optic component housing having a tubular extension. In accordance with the method of this invention, a predetermined length of the outer jacket is removed from the fiber optic cable to expose a length of optical fiber and lengths of the reinforcement strands. The optical fiber is then inserted into and through a passage in the tubular extension to a predetermined position within the component housing and preferably fixed in place. The plurality of reinforcement strands are then separated into at least two groups of strands. The groups of strands are then positioned about the outer diameter surface of the tubular extension so that certain areas of the outer diameter of the tubular extension are covered with the reinforcement strands and other areas are left exposed. A layer of adhesive is then placed over the groups of fibers, the exposed areas of the tubular extension, and a portion of the jacket remaining on the fiber optic cable. A length of heat-shrink tubing is positioned about the adhesive layer. The tubing is then heated causing it to shrink in diameter so as to form an adhesive connection of the exposed area of the tubular member, the groups of the reinforcement strands, the jacket of the cable, and the heat-shrink tubing.

BRIEF DESCRIPTION OF THE DRAWING

FIG. 1 is an isometric pictorial illustration of an electro-optic component housing secured to a fiber optic cable with the fiber optic cable termination of this invention.

FIG. 2 is an illustration of a typical electro-optic component housing of the type used in the present invention.

FIG. 3 is a cross-sectional illustration of a fiber optic cable taken as illustrated by the lines and arrows 3—3 on FIG. 1.

FIG. 4 is a cross-sectional illustration of the fiber optic cable termination of this invention taken as indicated by the lines and arrows 4—4 on FIG. 1.

FIG. 5 is a cross-sectional illustration of the completed fiber optic cable termination taken as indicated by the lines and arrows 5—5 on FIG. 1.

FIG. 6 is an illustration of a fiber optic cable having a terminal end portion of the jacket removed and the reinforcement strands separated into separate groups.

FIG. 7 is an illustration in cross section showing the position of the optical fiber and the reinforcement strands with the tubular extension of the component housing.

FIG. 8 is an illustration of an adhesive-lined heat-shrinkable tubing held in position with restraining members about the assembly illustrated in FIG. 7.

DETAILED DESCRIPTION OF THE INVENTION

In FIG. 1 there is illustrated a sealed electro-optic component housing 10 secured to a fiber optic cable with the fiber optic cable termination 14 of this invention.

The sealed electro-optic component housing 10 shown in FIG. 1 has a lid 16 sealed to the component housing 18 and includes an extension 20 which is hidden from view by the fiber optic cable termination 14.

In FIG. 2 the electro-optic component housing 18 is shown separate from the other elements of the structure of FIG. 1. As can best be seen from FIG. 2, the electro-optic component housing 18 has a main body 22 having an interior compartment 24 for receiving an electro-optic device (not shown) and a tubular extension 20 projecting away from the main body 22. The main body 22, as illustrated, is box-like in configuration but can be of any other configurations as required by the shape of the electro-optic device to be encased in the component housing 18. The tubular extension 20 is preferably formed as an integral part of the component housing 18 in order to facilitate hermetic sealing of the component housing 18. The tubular extension 20 projects a predetermined distance outwardly from the main body 22, which distance is sufficient to support an optical fiber 26 and permit a strong adhesive bond to be made to the tubular extension 20, as will be explained in greater detail below. The tubular extension 20 has a passage 28 which extends from the distal end 30 of the tubular extension 20 to the interior compartment 20 of the component housing 18. The tubular extension 20 has a diameter which is slightly larger than the diameter of the optical fiber 26. The outer surface 32 of the tubular extension 20 can be smooth but preferably is somewhat roughened in order to provide a surface with improved gripping properties.

The fiber optic cable 12 which is employed in this invention is of conventional construction of the type generally described above. As shown best in FIGS. 3 and 6, the fiber optic cable 12 has an optical fiber 26 in the center thereof which has a core 34 made of glass, a transparent plastic, or another transparent material, and a cladding layer 36 formed about the outer surface of the core 34. Surrounding the optical fiber 26 is a plurality of reinforcement strands 38 which are made of a relatively flexible, strong synthetic material, such as Kevlar (aramid fiber) sold by E. I. DuPont DeNemour and Company. A compliant jacket 40 made of Teflon (tetrafluoroethylene resin) or nylon is disposed about the reinforcement strands 38 of the fiber optic cable 12.

The initial step in the formation of the fiber optic cable termination 14 of this invention is to remove a predetermined length of the jacket 40 from a terminal end of the fiber optic cable 12 as shown in FIG. 6. The removal of a portion of the jacket 40 will cause the reinforcement strands 38 and the optical fiber 26 to be exposed.

The length of the portion of the jacket 40 which is removed should be at least as long as the length of the tubular extension 20 of the component housing 18 and preferably should be somewhat longer so as to expose a sufficient length of optical fiber 26 to facilitate proper alignment of the optical fiber 26 with the electro-optic device (not shown) packaged in the interior compartment 24 of the component housing 18.

The reinforcement strands 38 which are exposed on removal of the portion of the jacket 40 of the fiber optic cable 26 are separated into at least two groups 42, 44 thereby exposing the optical fiber 26 as illustrated in FIG. 6. The number of groups of reinforcement strands should be limited to no more than four in order to facilitate the fabrication of the fiber optic cable termination 14 of this invention. It has been found most preferable that the number of groups of reinforcement strands should be limited to two groups of approximately equal size as this is the simplest number to position and optimum results are obtained with this number of groups. Accordingly, the further description of this invention will be limited to the method wherein two groups 42, 44 are employed.

The optical fiber 26 is inserted into the distal end 30 and through the passage 28 of the tubular extension 20 and preferably substantially into the interior compartment 24 of the component housing 18. The terminal end of the optical fiber 26 is then placed in alignment with the electro-optic device (not shown). Thereafter, the optical fiber 26 is fixed in place by known methods, such as those shown in U.S. Pat. No. 4,237,474 of Ladany and U.S. Pat. 4,479,698 of Landis et al., and a hermetic seal (not shown) is preferably formed between the optical fiber 26 and the walls of the passage 28.

The groups 42, 44 of reinforcement strands are then positioned about the outer diameter surface 32 in an alternating pattern as shown in FIG. 7. The groups 42, 44 of reinforcement strands should preferably be spaced apart so that about equal size areas of the outer surface 32 of the tubular extension 20 are covered with the groups 42, 44 of the reinforcement strands and the alternating areas 46 of the tubular extension 20 are exposed.

After the groups 42, 44 of reinforcement strands are in position, an adhesive layer 48 and then a length of heat-shrink tubing 50 are applied about the groups 42, 44 of the reinforcement strands, the exposed areas 46 of the tubular extension 20, and an end portion 52 of the jacket 40 remaining on the fiber optic cable 12. The adhesive layer 48 can be applied by using a liquid adhesive composition or an adhesive in tape form and then the length of heat-shrink tubing 50 positioned over the adhesive layer 48. It has been found highly preferable, however, to use a commercially available heat-shrink tubing 50 which is supplied with a heat-activatable adhesive layer 48 about the inner surface of the heat-shrink tubing 50. The application of the adhesive layer 48 and the heat-shrink tubing 50 can then be made simultaneously in a more precise manner.

After the heat-shrink tubing 50 is in position, it is preferably held in contact with the exposed areas 46 of the tubular extension 20 by the clamp members 54, 56, as shown in FIG. 8, to prevent migration of groups 42, 44 of reinforcement strands over the exposed areas 46 of the tubular extension 20.

The heat-shrink tubing 50 is then heated with, for example, hot air, to cause the heat-shrink tubing 50 to shrink in diameter and also to activate the adhesive of the adhesive layer 48, if required. As is most clearly seen in FIGS. 3 and 4, as the heat-shrink tubing shrinks in diameter, it causes adhesive bonds to form between the groups 42, 44 of the reinforcement strands and the heat-shrink tubing 50, the exposed areas 46 of the tubular extension 20 and the heat-shrink tubing 50, and also the jacket 40 of the fiber optic cable 12 and the heat-shrink tubing 50. Accordingly, a fiber optic cable termination 14 is made in which all of the elements of the termination are either directly or indirectly secured to each other. The resulting fiber optic cable termination 14 has been found to be exceptionally, strongly and especially effective in preventing strain from being applied to the optical fiber 26 of the fiber optic cable 12.

What is claimed is:

1. A termination of a fiber optic cable with an electro-optic component housing wherein:

the fiber optic cable includes an optical fiber and a plurality of reinforcement strands aligned about the length of the optical fiber and a jacket positioned about the reinforcement strands except at a terminal end wherein a portion of at least a predetermined length of the jacket is removed to provide an unjacketed length of the optical fiber and unjacketed lengths of reinforcement strands; and the electro-optic component housing has an interior compartment and a tubular extension of said predetermined length having an internal passage in communication with the interior of the component housing and an outer diameter surface, reinforcement strand; and said termination being comprised of the unjacketed length of fiber positioned within the tubular extension and extending to at least interior compartment of the component housing, the unjacketed reinforcement strands being positioned in at least two groups about the outer diameter of the tubular extension to extend the length of the tubular extension in the same direction as the unjacketed fiber so as to leave approximately two portions of the outer diameter of the tubular extension exposed, a layer of adhesive over the groups of unjacketed reinforcement strands, exposed portions of the tubular extension and a portion of the jacket of the fiber optic cable; and, a length of shrink-fit tubing positioned about the layer of adhesive which tubing is in shrink-fit adhesive engagement with the unjacketed reinforcement strands, the exposed portions of the tubular extension and the portion of the jacket of the fiber optic cable.

* * * * *